Aug. 7, 1956  E. S. GILCHRIST  2,758,220
ELECTRONIC CONTROLLER FOR PROCESS CONTROL SYSTEMS
Filed March 3, 1955
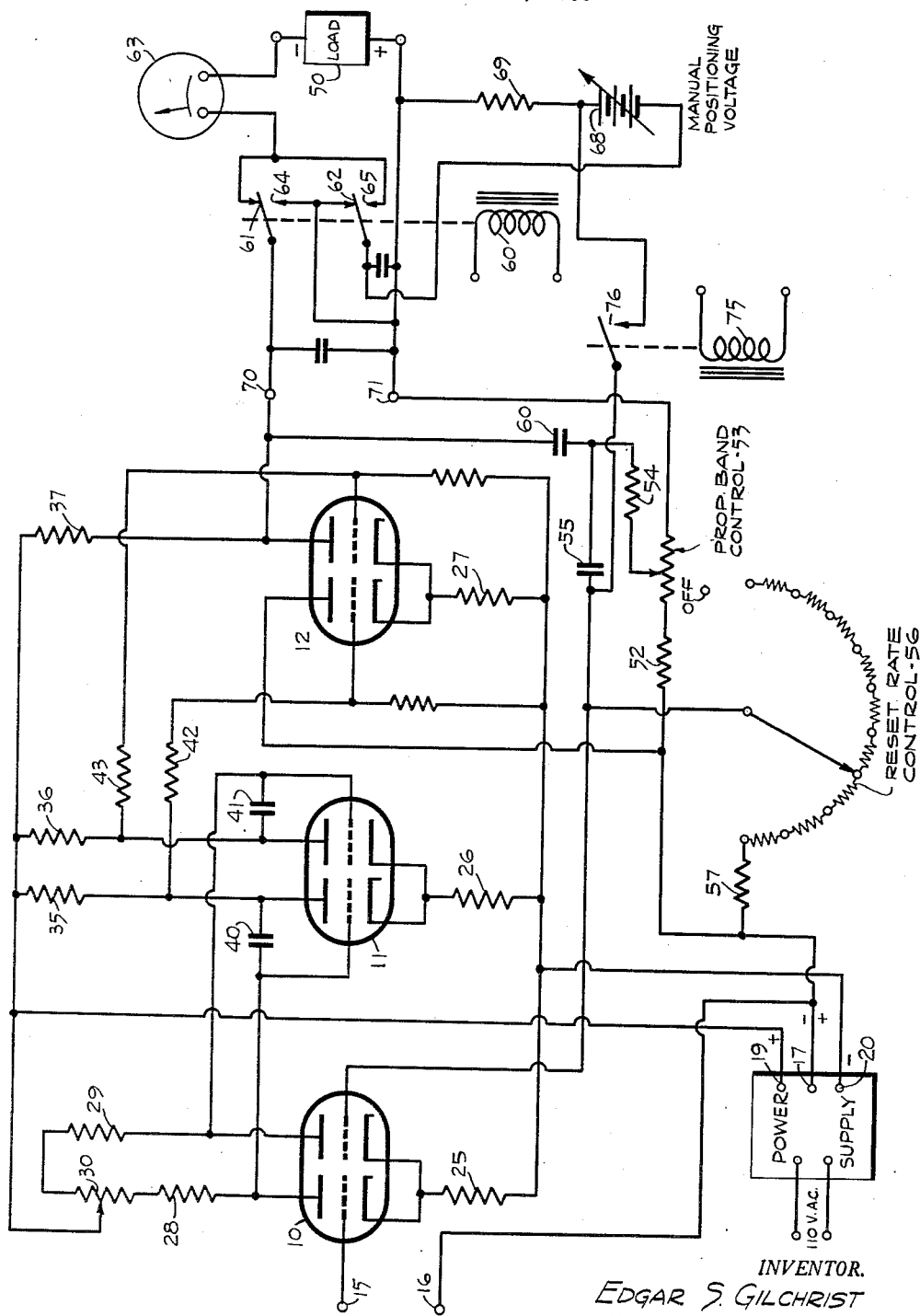
INVENTOR.
EDGAR S. GILCHRIST
BY
Mason, Kolehmainen, Rathburn & Wyss
ATTORNEYS

United States Patent Office 2,758,220
Patented Aug. 7, 1956

2,758,220

ELECTRONIC CONTROLLER FOR PROCESS CONTROL SYSTEMS

Edgar S. Gilchrist, Easton, Conn., assignor to Manning, Maxwell & Moore, Inc., Stratford, Conn., a corporation of New Jersey Application March 3, 1955, Serial No. 491,941

8 Claims. (Cl. 307—64)

The present invention relates to electronic controllers, and, more particularly, to electronic controllers which may be employed in automatic process control systems. Specifically, the present invention is directed to an improved electronic controller of the type disclosed in a copending application of Charles G. Roper and Edgar S. Gilchrist, Serial No. 389,564, filed on November 2, 1953 and assigned to the same assignee as the present invention.

In the electronic process control system disclosed in the above identified copending application, a direct current signal is transmitted between the process area and the control area. While this direct current signal is developed across relatively low impedance sources, in some situations an undesired alternating current signal, such as a 60 cycle signal from the power line, may be superimposed on the direct current control signal. This undesired alternating current signal may in some instances have a substantial amplitude and causes overloading of the controller, a shift in the zero setting of the controller, and other undesired effects. Also, when provision is made for manual to automatic changeover, the undesired alternating current signal may affect the controller during manual operation so that on switching back to automatic operation the direct current control signal may have an entirely random value.

When the controller is employed in a control system in which one time lag is predominant, such as in temperature and pressure control systems, the gain of the controller is preferably relatively high and the response of the controller may be relatively slow. On the other hand, when the controller is employed in a control system in which several small lags are present, such as in a flow control system, for example, it is desirable to have the controller respond as rapidly as possible so that an additional time lag will not be introduced into the system. Furthermore, if the controller is operated at high gain and several additive time delays are present in the system, the input signal to the system will oscillate and prevent proper control.

It is, therefore, an object of the present invention to provide a new and improved electronic controller for use in an automatic process control system.

It is another object of the present invention to provide a new and improved electronic controller for a process control system wherein undesired signals such as 60 cycle hum voltages and the like do not interfere with the operation of the controller.

It is a further object of the present invention to provide a new and improved electronic controller for a process control system wherein facilities are provided for manual to automatic changeover without responding to undersired A. C. voltages and the like.

It is still another object of the present invention to provide a new and improved electronic controller which may be employed in various types of process control systems and at various gain settings without responding to undesired A. C. voltages and the like.

Briefly, in accordance with one aspect of the invention, a differential amplifier is provided having two input circuits and one output circuit. A feedback circuit is employed between the output circuit and one input circuit, and the input signal of the system, which may contain an undesired 60 cycle hum voltage, is impressed on the other input circuit. The feedback circuit includes a frequency sensitive network so that the gain of the controller varies inversely with frequency and at a frequency of 60 cycles per second the maximum gain of the controller is relatively small regardless of the proportional band setting of the controller. In addition, the feedback circuit is so arranged that the capacitive elements thereof are not charged up in response to A. C. voltages during periods of manual operation so that manual to automatic changeover can be smoothly made even though the error signal to the controller includes an undersired A. C. hum voltage.

The invention, both as to its organization and method of operation, together with further objects and advantages thereof, will best be understood by reference to the following specification taken in connection with the accompanying drawings, in which the single figure thereof is an electrical schematic diagram of an electronic controller embodying the features of the present invention.

Referring now to the drawing, the electronic controller of the present invention is therein illustrated as comprising a plurality of double-triode vacuum tubes 10, 11 and 12, the tubes 10 and 11 being preferably of the commercial type 12AX7 and the tube 12 being preferably of the commercial type 12AU7. An error signal, which is proportional to the deviation of the measured variable from the predetermined set point, is applied to the input terminals 15 and 16 of the controller, the terminal 16 being connected to an output terminal 17 of intermediate potential which is produced by the power supply 18, a potential positive with respect to the terminal 17 being produced at the output terminal 19 of the supply 18 and a potential negative with respect to the terminal 17 being produced at the output terminal 20. The cathodes of the two triode sections of the tubes 10, 11 and 12 are connected together and are connected through the respective common cathode resistors 25, 26 and 27 to the negative output terminal 20. The anodes of the tube 10 are energized from the positive terminal 19 through the anode load resistors 28 and 29, a potentiometer 30 being employed to balance the two triode sections of the tube 10 for correct differential amplifier operation. In a similar manner the anodes of the tube 11 are energized through the load resistors 35 and 36 and the anodes of the right hand section of the tube 12 is energized from the positive terminal 19 through the load resistor 37. The signals developed at the anodes of the tube 10 are coupled to the corresponding control grids of the tube 11 and feedback condensers 40 and 41 are connected between the anode and control grid of each triode section of the tube 11. The anodes of the tube 11 are directly coupled to the respective control grids of the output tube 12 through the voltage dividing resistors 42 and 43 and the anode and cathode resistors 37 and 27 of the right hand triode section of the tube 12 are so chosen that current flows through the load circuit 50 in the polarity indicated in the drawing, i. e., the anode of the right hand section of the tube 12 is operated at a potential below the potential of the intermediate terminal 17 of the supply 18.

In order to provide proportional band control, a resistor 52 and a proportional band potentiometer control 53 are connected in series between the terminal 17 and the load circuit 50 and a feedback signal is derived from the arm of the potentiometer 53 which is coupled through the resistor 54 and the condenser 55 to the control grid of the right hand section of the tube 10. To provide for adjustable automatic reset rate response in the controller, the movable arm of a reset rate control potentiometer 56 is connected to the control grid of the right-hand section of the tube 10, one side of the potentiometer 56 being connected through the resistor 57 to the intermediate potential terminal 17.

To provide a manual control arrangement whereby the final control element of the process control system may be positioned manually while permitting the system to be changed back to automatic operation as desired, a changeover relay 60 is provided having the normally closed contacts 61 and 62. Relay 60 is deenergized during automatic operation so that current flows through the resistor 52, the proportional band potentiometer 53, the load circuit 50, the indicating meter 63, and the contacts 61 to the anode of the right-hand section of the tube 12. When it is desired to change to manual operation, the relay 60 is energized so as to close the contacts 64 and 65 thereof. When the relay 60 is energized a D. C. current from a variable direct current source indicated schematically as the battery 68 flows through the resistor 69, the load circuit 50, the meter 63 and the contacts 65 to the negative side of the direct current voltage source 68, the output terminals 70 and 71 of the controller proper being short-circuited through the contact 64 for manual operation. The resistor 69 is of the same resistance value as the proportional band potentiometer 53 and during manual operation a second relay 75 is energized at the same time as the changeover relay 60 so that the contacts 76 thereof are closed and the voltage developed across the resistor 69 is directly impressed upon the control grid of the right-hand section of the tube 10. In this connection it will be understood that the relays 60 and 75 are usually in different physical units so that separate relays are required to establish the above-described circuit connections. However, if the manual positioner unit is at the same location as the controller proper the contacts 76 may form a part of the changeover relay 60.

In considering the operation of the controller unit described thus far, it may be pointed out that this controller unit is identical in many respects to the electronic controller shown and described in detail in the above-identified copending application and reference may be had to said copending application for a detailed description thereof. However, for the purposes of the present invention it may be generally stated that the error signal which is impressed upon the input terminals 15, 16 is supplied directly to the control grid of the left-hand section of the tube 10 and due to the common cathode coupling in each of the differential amplifier tubes 10, 11 and 12 the voltage difference between the control grids of the two sections of the tube 10 is amplified through the tubes 10, 11 and 12 and appears at the output of the controller. Considering first the proportional action of the controller, and assuming that the reset rate potentiometer 56 is connected to the off position, an output current will flow in the load circuit 50 of such value that the voltage produced between the arm of the proportional band potentiometer 53 and the common terminal 17 substantially equals the input signal applied to the terminals 15, 16. Thus, if the arm of the potentiometer 53 is in the narrow proportional band setting, i. e., is moved to the left as shown in the drawing, a relatively small feedback voltage will be impressed upon the control grid of the right-hand section of the tube 10 so that the controller is operated at a relatively high gain. On the other hand, if the potentiometer 53 is adjusted to the 200% proportional band setting, i. e., is moved to the extreme right as shown in the drawing, a maximum feedback voltage is impressed upon the right-hand section of the tube 10 and the controller is operated at minimum gain. To provide reset rate action, the condenser 55 and the potentiometer 56 cooperate to provide a differentiated or leading component of voltage in the feedback circuit so that the output current flowing through the load circuit 50 changes slowly at a rate determined by the setting of the potentiometer 56. It will be noted that when the control 56 is in the off position the condenser 55 is open circuited so that this condenser retains its previous charge. This arrangement then corresponds to a very slow reset rate when the control 56 is in the off position so as to conform to conventional practice in controllers having automatic reset action.

During manual operation, i. e., periods when the relays 60 and 75 are energized, the entire voltage developed across the proportional band potentiometer 53 is fed back to the control grid of the right-hand section of the tube 10 through the resistor 69 and the contacts 76 of the relay 75. Accordingly, if the input signal applied to the terminals 15, 16, contains a 60 cycle component, a hum component of the same amplitude is produced across the left-hand portion of the control 53 and the resistor 52 with the result that a correspondingly larger hum voltage is produced over the entire potentiometer 53 which is coupled through the resistor 69 and the contacts 76 to the condenser 55. If the condenser 55 is charged in proportion to the large A. C. voltage component developed across the right-hand portion of the potentiometer 53, when the controller is changed back to automatic operation the output current flowing through the load circuit 50 at the instant of changeover may have a random value depending upon the particular point in the 60 cycle hum voltage at which changeover is effected. However, in accordance with the present invention, the condenser 55, which is required for reset rate action in the controller, is not permitted to charge by any appreciable amount during manual operation even though a 60 cycle component of substantial amplitude is developed across the proportional band potentiometer 53. More particularly, the resistor 54 is connected between the condenser 55 and the arm of the potentiometer 53 so that substantially all of the 60 cycle hum voltage is developed across the resistor 54, and the condenser 55 has relatively little A. C. voltage developed thereacross. Accordingly, even though the arm of the potentiometer 53 is moved to the extreme left or narrow band position the resistor 54 is included in series with the condenser 55 so that very little 60 cycle voltage is developed across the condenser 55 during periods of manual operation. Therefore, when the change from manual to automatic operation is made the current flow through the load circuit 50 assumes the correct value irrespective of the presence of a 60 cycle hum component in the input signal applied to the terminals 15, 16. It will be noted that with the resistor 54 connected in series with the condenser 55 in the manner shown in the drawing, switching transients which may be produced at the contacts of the changeover relay 60 during manual to automatic changeover cannot appreciably affect the charge on the condenser 55 since this condenser must necessarily be charged through the resistor 54. It will also be noted that if an error voltage exists before manual to automatic changeover the deviation in output current upon changeover will be equal to only one-half of the error signal existing at the moment of changeover, as described in more detail in the above-identified copending application.

When the controller of the present invention is employed in control systems in which one time lag is predominant, such as in temperature and pressure control systems, the gain of the controller is preferably relatively high although extremely rapid controller response is not required. However, if the controller is operated at high gain and a 60 cycle hum component is present in the input signal applied to the terminals 15, 16 overloading of the amplifier tubes 10, 11 and 12 may be produced with the result that the zero level of the controller is shifted and precise control is not achieved. On the other hand, when the controller is employed in flow control systems wherein several additive time lags are produced throughout the system, it is desirable to provide rapid response in the controller so that an additional time lag will not be introduced into the system. To resolve these conflicting requirements there is provided in accordance with the present invention, means for varying the gain of the controller inversely with respect to the frequency of the input signal so that regardless of the setting of the proportional band control 53, the gain of the controller will always be relatively low for an input frequency of 60 cycles per second and hum voltages of this frequency will not adversely affect the controller. More particularly, the condenser 60 is connected from the output terminal 70 to the junction point of the condenser 55 and the resistor 54. The condenser 60 and the resistor 54 function as a voltage divider connected between the arm of the potentiometer 53 and the terminal 70 so that the amount of voltage fed back to the control grid of the right-hand section of the tube 10 varies with frequency. Thus, as the frequency of the input signal increases the impedance of the condenser 60 decreases so that a larger feedback voltage is impressed upon the control grid of the right hand section of the tube 10 with the result that the gain of the controller is decreased. In this connection it will be understood that the condenser 55 and reset rate potentiometer 56 have relatively large values as compared to the condenser 60 and the resistor 54 so that the elements 55, 56 do not have any substantial effect on the above described voltage divider action. Preferably, the condenser 60 has a capacity of 0.1 microfarad, the resistor 54 has a value of 100,000 ohms, the condenser 55 has a value of 4 microfarads for a reset rate of 0.1 to 10 repeats per minute, the potentiometer 56 has a total resistance value of 150 megohms, the potentiometer 53 has a value of 10,000 ohms, and the resistor 69 has a value of 10,000 ohms. With these circuit constants, when the proportional band control 53 is adjusted for maximum gain, i. e., the arm of the potentiometer 53 is moved to the extreme left as viewed in the drawing, the gain of the controller starts to decrease at approximately 1 cycle per second and at a frequency of 60 cycles per second the gain of the controller is reduced substantially. It will be noted that the above described variation in gain with frequency is achieved automatically and is provided for any given setting of the proportional band control 53. Accordingly, the controller may be set for high gain so that it may be used for temperature and pressure control applications while preventing overloading of the controller by a 60 cycle hum voltage. On the other hand, if the gain of the controller is at a relatively low setting, such as required for flow control applications, the rate of response of the controller is increased proportionately so that no additional time lag is introduced into the control system. This latter action for flow control systems will be readily apparent when it is realized that as the arm of the potentiometer 53 is moved to the right as viewed in the drawing, the band width of the controller is proportionately increased because the entire feedback voltage developed across the potentiometer 53 and resistor 52 is fed through the resistor 54 without additional feedback through capacitor 60 at the higher frequencies, so that relatively fast response at low controller gain is provided. In this connection, it will be noted that the frequency at which the gain of the controller starts to decrease is controlled by the above described voltage divider and not the gain of the amplifier tubes 10, 11 and 12 so that more precise determination of this frequency can be achieved. It will also be noted that no integrating network is required at the input of the controller to remove 60 cycle hum voltage from the input signal so that the controller does not introduce an additional time lag due to the integration network and, hence, is particularly suited for flow control applications. In this connection it will be understood that the condensers 40 and 41 are provided to stabilize the controller at relatively high frequencies and have no substantial effect upon the gain of the controller at a frequency of 60 cycles per second.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In an electronic controller, amplifier having a pair of input circuits and an output circuit, means for impressing an input signal on one of said input circuits, a work circuit, means including a first impedance connected in series with said work circuit for normally energizing said work circuit from said output circuit, means including a condenser for feeding back at least a portion of the voltage developed across said first impedance to said other input circuit, an adjustable current source including a second impedance, switch means for connecting said current source to said work circuit in place of said output circuit, means for impressing the voltage developed across said second impedance on said other input circuit when said current source is connected to said work circuit, and means for preventing said condenser from being charged in response to an alternating current component of said input signal when said current source is connected to said work circuit.

2. In an electronic controller, amplifier having a pair of input circuits and an output circuit, means for impressing an input signal on one of said input circuits, a work circuit, means including a first impedance connected in series with said work circuit for normally energizing said work circuit from said output circuit, means including a condenser for feeding back at least a portion of the voltage developed across said first impedance to said other input circuit, an adjustable current source including a second impedance, switch means for connecting said current source to said work circuit in place of said output circuit, means for impressing the voltage developed across said second impedance on said other input circuit when said current source is connected to said work circuit, and means including a resistor connected between said condenser and said first impedance for preventing said condenser from being charged in response to an alternating current component of said input signal when said current source is connected to said work circuit.

3. In an electronic controller, a amplifier having a pair of input circuits and an output circuit, means for impressing an input signal on one of said input circuits, a work circuit, means including a first impedance connected in series with said work circuit for normally energizing said work circuit from said output circuit, means including a condenser for feeding back at least a portion of the voltage developed across said first impedance to said other input circuit, an adjustable current source including a second impedance, switch means for connecting said current source to said work circuit in place of said output circuit, said first and second impedances being substantially equal, means for impressing the voltage developed across said second impedance on said other input circuit in the opposite polarity from said feedback voltage when said current source is connected to said work circuit, whereby an alternating current component of said input signal is developed across said first impedance and is coupled through said second impedance to said condenser when said current source is connected to said work circuit and means for preventing said condenser from being charged in response to said alternating current component supplied thereto through said second impedance.

4. In an electronic controller, a amplifier having a pair of input circuits and an output circuit, means for impressing an input signal on one of said input circuits, a work circuit, means including a first impedance connected in series with said work circuit for normally energizing said work circuit from said output circuit, means including a condenser for feeding back at least a portion of the voltage developed across said first impedance to said other input circuit, an adjustable current source including a second impedance, switch means for connecting said current source to said work circuit in place of said output circuit, said first and second impedances being substantially equal, means for impressing the voltage developed across said second impedance on said other input circuit in the opposite polarity from said feedback voltage when said current source is connected to said work circuit, whereby an alternating current component of said input signal is developed across said first impedance and is coupled through said second impedance to said condenser when said current source is connected to said work circuit and means including a resistor connected between said condenser and said first impedance for preventing said condenser from being charged in response to said alternating current component supplied thereto through said second impedance.

5. In an electronic controller, a amplifier having a pair of input circuits and an output circuit, means for impressing an input signal on one of said input circuits, a work circuit, means including a first impedance connected in series with said work circuit for normally energizing said work circuit from said output circuit, means including a resistance-capacitance network for feeding back a variable portion of the voltage developed across said first impedance to the other of said input circuits, thereby to supply current to said work circuit in proportion to said input signal and to provide an automatic reset component in accordance with the time constant of said network, an adjustable current source including a second impedance, switch means for connecting said source to said work circuit in place of said output circuit, means for impressing the voltage developed across said second impedance on said other input circuit when said current source is connected to said work circuit, and means for preventing the capacitive branch of said network from being charged in response to an alternating current component of said input signal when said current source is connected to said work circuit.

6. In an electronic controller, an amplifier having a pair of input circuits and an output circuit, means for impressing an input signal on one of said input circuits, a work circuit, means including a first impedance connected in series with said work circuit for normally energizing said work circuit from said output circuit, means for feeding back a variable portion of the voltage developed across said impedance to the other of said input circuits, thereby to supply current to said work circuit in proportion to said input signal, and means for varying the bandwidth of said differential amplifier in proportion to said feedback voltage.

7. In an electronic controller, an amplifier having a pair of input circuits and an output circuit, means for impressing an input signal on one of said input circuits, a work circuit, means including a first impedance connected in series with said work circuit for normally energizing said work circuit from said output circuit, means for feeding back a variable portion of the voltage developed across said impedance to the other of said input circuits, thereby to supply current to said work circuit in proportion to said input signal, and means including a condenser connected between said output circuit and said other input circuit for varying the bandwidth of said differential amplifier in proportion to said feedback voltage.

8. In an electronic controller, an amplifier having a pair of input circuits and an output circuit, means for impressing an input signal on one of said input circuits, a work circuit, means including a potentiometer connected in series with said work circuit for energizing said work circuit from said output circuit, means connecting the arm of said potentiometer to the other of said input circuits, thereby to supply current to said work circuit in proportion to said input signal, and means including a voltage divider network connected between said work circuit and the arm of said potentiometer for varying the bandwidth of said differential amplifier in proportion to said feedback voltage.

No references cited.